Sept. 4, 1951  D. H. QUINN  2,566,371
WATER FILTER
Filed May 3, 1946  5 Sheets-Sheet 1
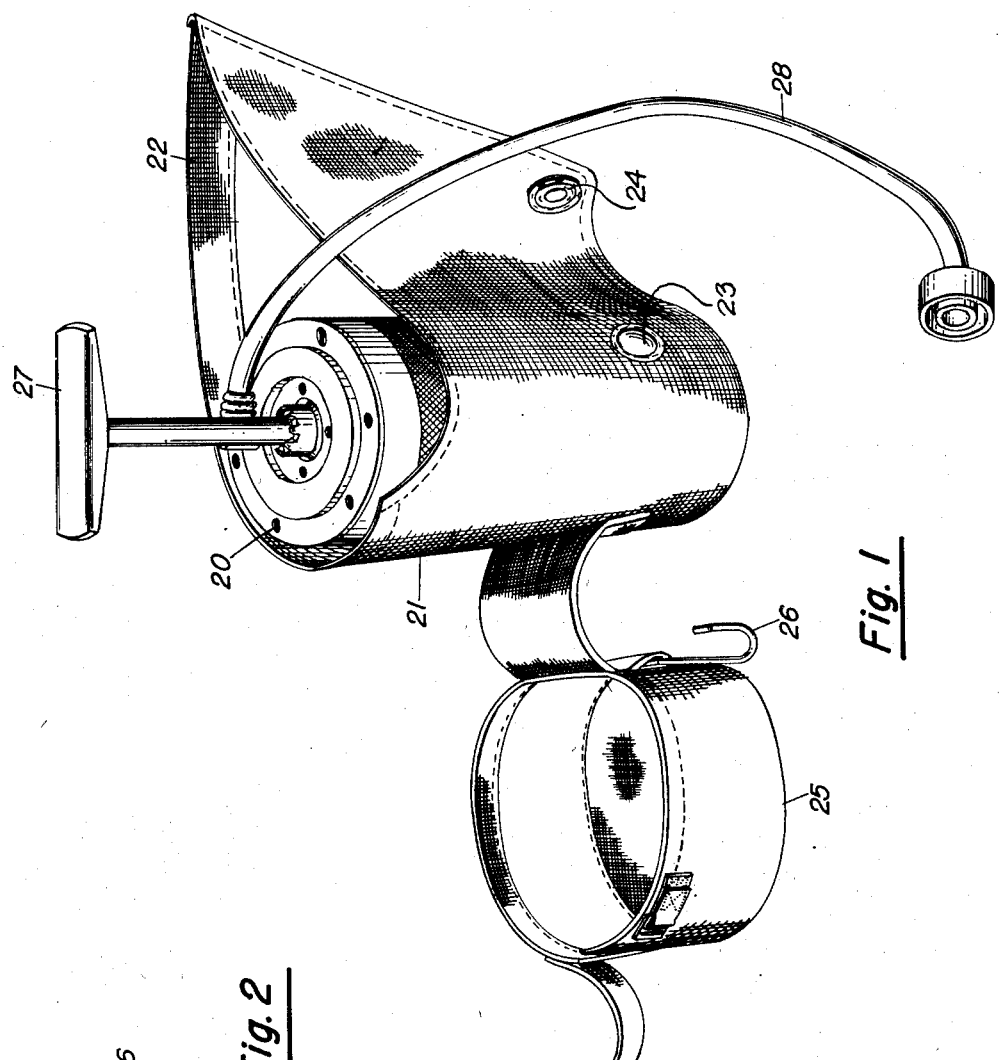
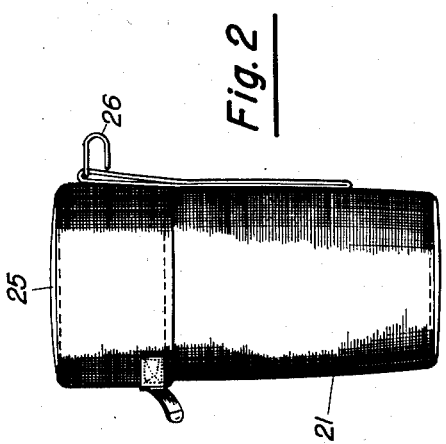
Inventor
David H. Quinn Sept. 4, 1951  D. H. QUINN  2,566,371
WATER FILTER
Filed May 3, 1946  5 Sheets-Sheet 2
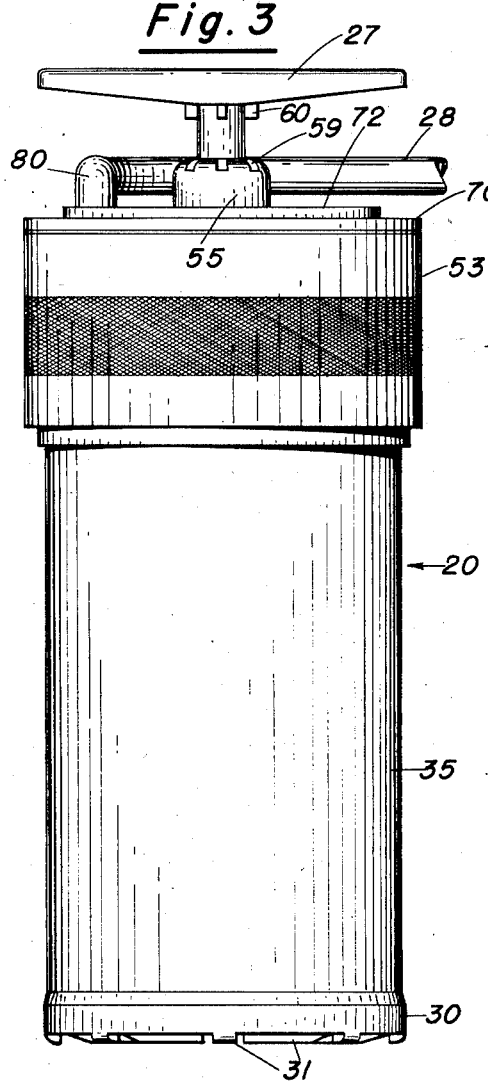
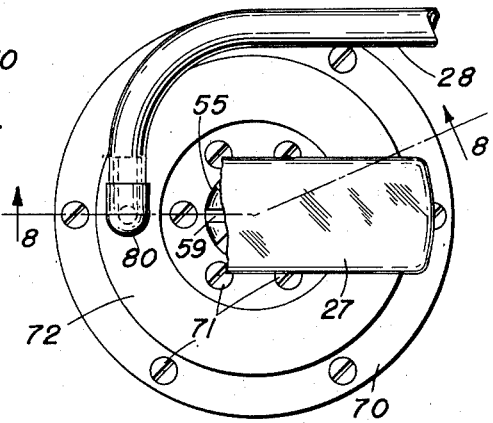
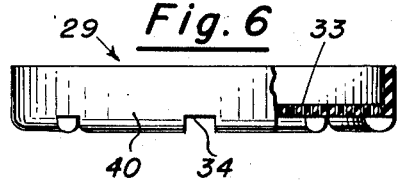
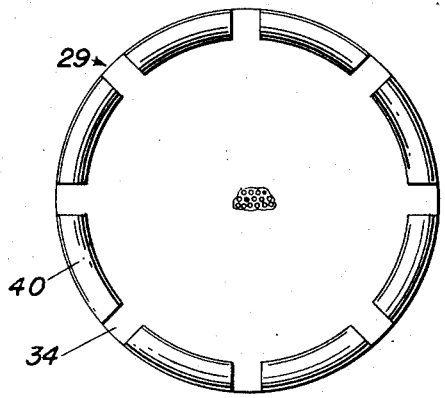
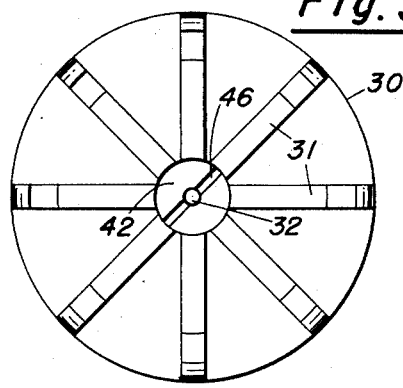
Inventor
David H. Quinn
By
Attorney Sept. 4, 1951     D. H. QUINN     2,566,371
WATER FILTER
Filed May 3, 1946     5 Sheets-Sheet 3

Inventor
David H. Quinn
By F. Schmitt
Attorney

Sept. 4, 1951 D. H. QUINN 2,566,371
WATER FILTER
Filed May 3, 1946 5 Sheets-Sheet 4

Inventor
David H. Quinn
By G. J. Schmitt
Attorney

Sept. 4, 1951  D. H. QUINN  2,566,371
WATER FILTER
Filed May 3, 1946  5 Sheets-Sheet 5
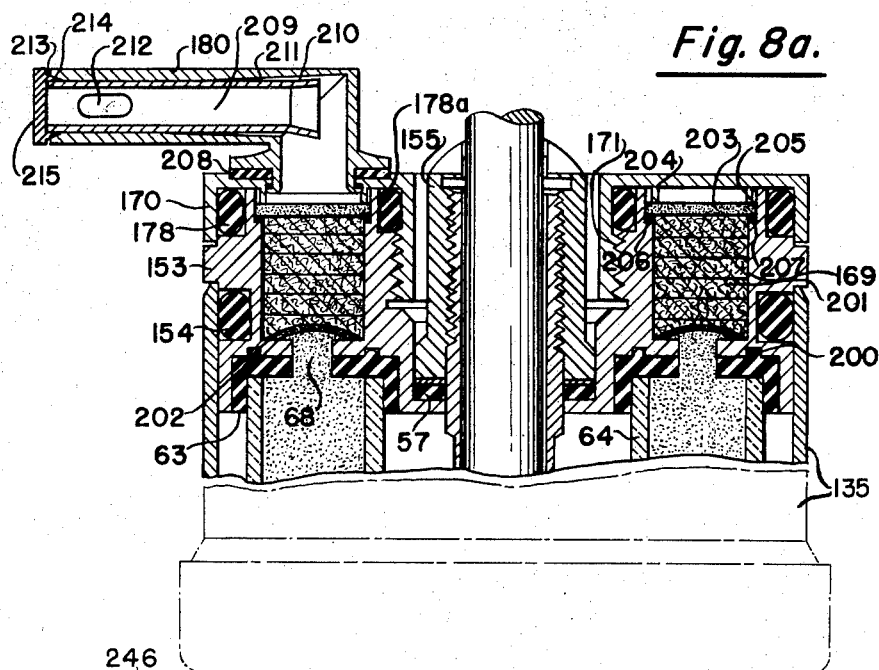
Fig. 8a.
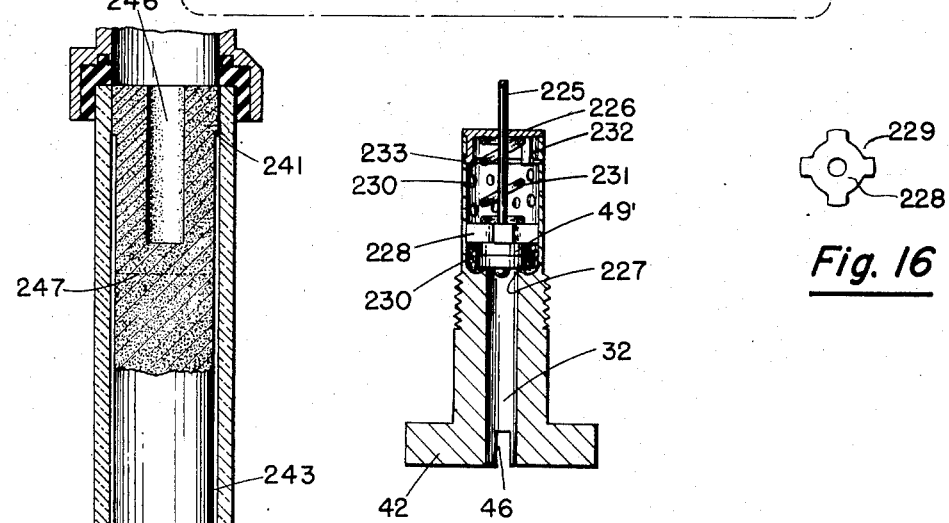
Fig. 15
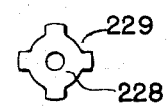
Fig. 16
Fig. 17
Inventor
DAVID H. QUINN
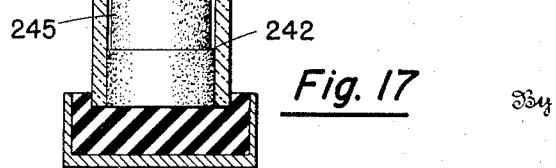
Attorney Patented Sept. 4, 1951

2,566,371

UNITED STATES PATENT OFFICE 2,566,371

WATER FILTER

David H. Quinn, United States Navy

Application May 3, 1946, Serial No. 666,939

17 Claims. (Cl. 210—113)

(Granted under the act of March 3, 1883, as amended April 30, 1928; 370 O. G. 757)

This invention relates to an apparatus which may be carried on the person and used to purify polluted water to make it suitable for drinking purposes.

The provision of a supply of pure drinking water is an important consideration in the case of armed forces on military operations, or for people on camping trips, etc., since water is frequently available, but it is not always suitable for human consumption. The apparatus forming this invention provides a compact device which may be conveniently carried by one person as a non-expendable piece of equipment for the purpose of purifying water for himself or a group. In general, this apparatus has the same purpose as that disclosed in my application Serial No. 523,843, filed February 25, 1944, and entitled "Water Purifier," which matured into Patent No. 2,434,958 on January 27, 1948. The instant apparatus differs, however, in several respects from that disclosed in my previous application and includes improvements thereover. One of the novel aspects of the instant apparatus is the provision of a combined carrying case and bucket to be used in combination with the purifying unit.

It is therefore the primary object of my invention to provide a new and improved apparatus for the purification of water for drinking purposes which can be carried on the person, and which can be taken apart for cleaning or repair without the use of any tools other than part of the apparatus itself.

Another object of the invention is the provision of a novel combination of water purifier and receptacle which is used to scoop relatively clear water from the top of a body of water and which serves as a carrying case when the apparatus is not in use.

It is another object of the invention to provide a water purifying apparatus having a novel non-clogging valve structure.

Other objects will become apparent as the description proceeds in connection with the appended drawings, wherein:

Fig. 1 is a perspective view of the combined purifier ready for operation within its carrying case which is opened up and in position for holding water which is to be purified.

Fig. 2 is a perspective view of the carrying case with the purifier inside and ready to be attached to a support so as to be carried by a person.

Fig. 3 is a view in side elevation of the purifier alone, with the inlet filter removed.

Fig. 4 is a top plan view of the purifier of Fig. 3, with part of the handle broken away.

Fig. 5 is a bottom plan view of the purifier of Fig. 3, with the inlet filter removed.

Fig. 6 is a side elevation, partly in section of the inlet filter.

Fig. 7 is a bottom plan view of the inlet filter.

Fig. 8a is a view of a modified form of the purifier shown in Fig. 8, the differences therefrom being shown in section.

Fig. 15 is a view in side elevation of a modified form of inlet valve.

Fig. 16 is a plan view of a portion of the valve shown in Fig. 15.

Fig. 17 is a vertical sectional view of a modified form of filter tube filling.

Figure 8:
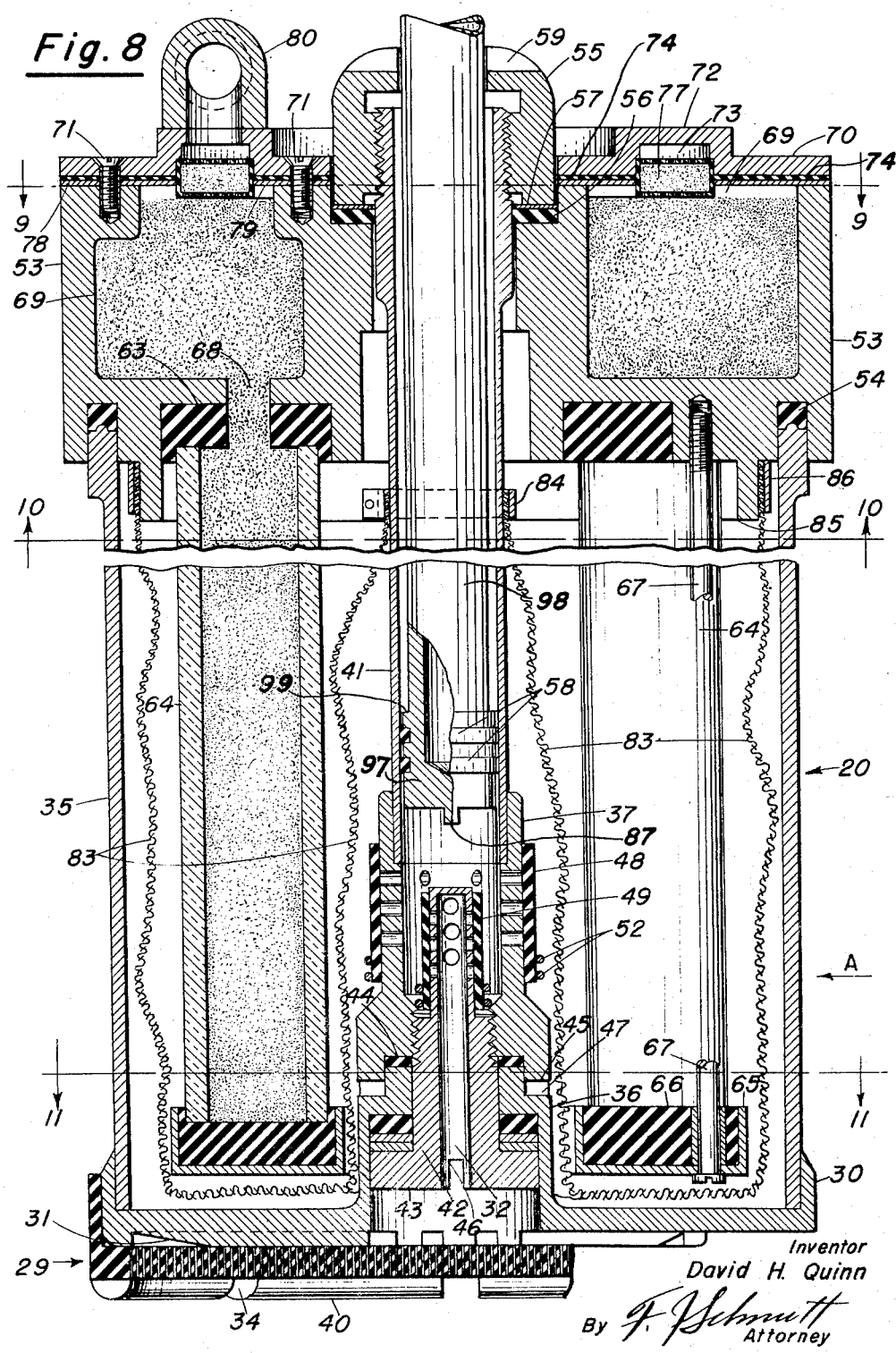
Fig. 8 is a vertical sectional view of the purifier substantially along the line 8—8 of Fig. 4, (also along the line indicated by line 8—8 of Fig. 11) looking in the direction of the arrows, and having the inlet filter attached.
Figure 9:
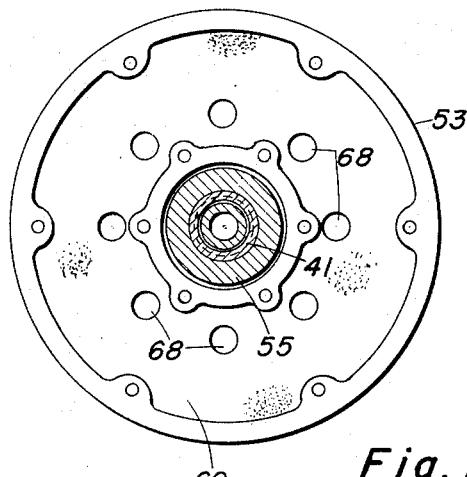
Fig. 9 is a sectional view of the purifier substantially along the line 9—9 of Fig. 8, looking in the direction of the arrows.
Figure 10:
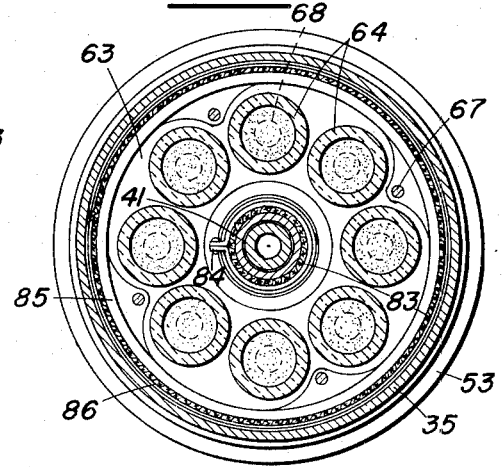
Fig. 10 is a sectional view of the purifier substantially along the line 10—10 of Fig. 8, looking in the direction of the arrows.

As shown in Fig. 1, the filter unit 20 is within its combination fabric carrying container and bucket 21 having an elongated flap 22 which will hold water, as will be described. When the container or receptacle is used merely to carry the filter, the flap is rolled around the container, the mating fasteners 23 and 24 are snapped together, and the hinged cover 25 is closed over the top of the container as shown in Fig. 2. A conventional hanger 26 on the cover similar to that on an army canteen cover, furnishes means by which the container may be attached to a cartridge belt or the like. The water inlet to the filter unit is at the bottom thereof. When it is desired to use the filter unit, it is removed from the container 21, and the container is used as a bucket to scoop the least turbid water from the surface of a body of water, which may be a mud puddle or the like. The filter unit is then inserted into the container. Without the flap 22, most of the water would be displaced from the container, but since the water can occupy the space within the open flap, there will still be a substantial amount of the water within the container. The container with the filter in it can then be placed upon a solid support and the pump handle 27 operated to suck water into the filter from the bottom of the container, filter and purify it, and discharge it from the effluent tube 28. The container 21 thus provides means for obtaining a relatively clear water from the surface of a water supply which may be quite turbid, especially at the bottom, and it is therefore an important part of the equipment.

The filter unit 20 itself is shown in Figs. 3 to 5, with the inlet filter 29 (shown in Figs. 6, 7 and 8) removed in order to show the radial ribs 31 on the bottom 30 of the filter unit between which water passing through the inlet filter 29 flows to the inlet 32 of the filter unit 20. The inlet filter 29 is cup-shaped so that it can be slipped over the bottom of the filter unit. The inlet filter 29 is made of rubber so that it will grasp the bottom of the filter unit, and has a large diameter section 33 which is perforated with from 3200 to 6400 perforations per square inch. It also has a peripheral external rib 40 on its bottom surface to support its perforated section 33 above the surface on which the filter unit is resting, there being interruptions 34 in the annular rib to permit the passage of water past the rib. The rubber inlet filter is flexible and when it becomes clogged it is slipped off the filter unit and flexed while it is being washed, in order to dislodge the material clogging the perforations.

The filter unit 20 comprises a cylindrical casing 35 attached as by soldering to the bottom 30. The bottom 30 has a hollow central post 36 which forms a support for a tube 37 forming an enlarged and downwardly extending extension on a vertical centrally disposed pump cylinder 41. At its bottom, the tube 37 is internally threaded for engagement with a flanged stud 42 which is centrally bored to provide the water inlet 32. The flange 43 on the bottom of the stud 42 bears against an internal shoulder on the post 36, there being a rubber sealing washer and one or more metal washers between the flange and shoulder. At its bottom the tube 37 is enlarged and has a shoulder 44 mating with an opposed shoulder on the top of the post 36, there being a rubber sealing washer between the mating shoulders on the tube and the post. The flanged stud 42 serves to draw the tube 37 against the mating post 36 and compress the above described sealing washers. A screw driver slot 46 on the bottom of the stud provides means by which it can be turned. In order to keep the tube 37 from turning while the stud 42 is being tightened, the shoulder 44 on the tube 37 is provided with a pair of diametrically disposed projecting lugs 45 which are engaged in a pair of similarly disposed grooves 47 in the post 36. This construction permits the tube 37 with its pump outlet check valve 48 to be removed from the filter unit for cleaning, and similarly permits the removal of the pump inlet check valve 49 for the same purpose.

The pump inlet check valve comprises a flexible rubber tube 49 clamped at its bottom to the upper portion of the stud 42 which it surrounds. The upper walls of the stud are perforated as shown, to allow water to enter the interior of the tube 37 from the inlet 32 when the pump piston 97 is pulled upwardly by means of the handle 27. The tube 37 is also perforated to allow water to pass into the interior of the casing 35 when the pump piston is pushed down. The elastic tube 49 prevents water from being pushed back into the inlet 32 when the pump piston is pushed down and spreads to open the inlet ports in stud 42 on the upstroke of the pump piston. A similar elastic tube forms the pump outlet check valve 48 and prevents water from reentering the pump cylinder when the pump piston is pulled up. The tube 48 is fastened at the bottom to the exterior of the tube 37 by one or more clamps 52. The check valves shown have been found to operate satisfactorily without being fouled by dirt particles which pass the inlet filter 29, whereas such particles have frequently prevented spring pressed ball type check valves from seating.

A casting forming a lower head member 53 has an annular groove on its bottom surface which engages the top of the cylindrical casing 35, there being a rubber gasket 54 within the groove. The member 53 has a central bore through which the upper end of the pump cylinder 41 passes. At its upper end, the cylinder 41 has external threads which are engaged by a gland nut 55. The bottom of the gland nut seats on an internal shoulder surrounding the central bore in the lower head member, there being a rubber sealing washer or gasket 56 and a slip washer 57 between the nut and the shoulder. The bore at the upper end of the gland nut permits reciprocation of the pump piston rod 98 but is too small to permit the passage of shoulder 99 on the piston. The upper surface of the gland nut is provided with notches 59 which are engaged by lugs 60 on the bottom of the pump handle in a manner similar to that disclosed in said earlier application, Serial No. 523,843. The head member 53 is thus clamped against the casing 35 by pushing the pump to the bottom of its stroke until the lugs 60 engage the notches 59 and then turning the handle. The nut 55 forces the member 53 against the gaskets 54 and 56 to seal the filter unit and hold it together. The lugs 45 on the bottom of the tube 37 prevent the cylinder 41 from rotating when the gland nut is being turned.

On its lower side the head member 53 has a substantially annular channel within which is received a resilient rubber gasket 63. An annular series of fine porosity ceramic filter tubes 64 have their upper ends pressed into individual shallow recesses in the gasket 63 by means of a rigid annular channel member 65 which has within it a resilient imperforate gasket 66 similar in shape to gasket 63. A series of four equiangularly spaced tie rods 67 have their heads engaged under the member 65 and their upper ends threaded into the head member 53, so that when they are tightened, the filter tubes 64 are clamped between the channel member 65 and the head member 53, the tubes being sealed against leaks at their ends, and also resiliently guarded against shock, by the gaskets 63 and 66.

In its upper portion, the lower head member 53 has a large annular channel 69, open at the top, and communicating through its bottom wall with the interior of each of the filter tubes 64 by means of passageways 68 which also pass through the gasket 63 and which are substantially coaxial with the filter tubes.

The interior bores of the filter tubes 64, the passageways 68, and the entire annular channel 69 are filled with a mass of mixed granular adsorbents. The adsorbents used are silica gel or activated carbon or the like or a mixture of them, and they are of rather small size to provide a maximum of surface area. In order to provide an oligodynamic or bactericidal action, the mass also contains oligodynamic metals and/or metal salts of low solubility. A large surface area is provided by coating adsorptive materials such as activated carbon or silica gel with the metal or metal salts. However, in order to provide a bactericidal or germicidal effect on water which is passing through the material in a short space of time, it is necessary to make the coating of metal so heavy that the microscopic sinus channels in the adsorbent become blocked and the adsorbent capacities thereby inhibited. I have found that an effective combination of adsorptive and oligodynamic action is obtained when both untreated adsorbents and adsorbents coated with oligodynamic materials are mixed. In this case the adsorbents are used merely as a carrier for a coating of the oligodynamic materials. I have also found that the oligodynamic action of the metal is improved if two or more oligodynamic metals such as a mixture of silver and gold or copper coated adsorbents, or a mixture of two or more are used. Since the bactericidal action of the oligodynamic materials is proportional to the number of ions carried into solution, it may be that the improved result is due to a galvanic couple between the two or more materials, which may aid in putting more ions into solution. Most of the granular mass of adsorbent material is untreated, to provide adequate adsorption, but a substantial percentage is coated with the oligodynamic material. With granules coated with metals or metal salts uniformly dispersed within the mass, a very effective germicidal action is provided which maintains sterility within the purifier under all conditions and yet does not inhibit the action of the untreated adsorbents.

The top of the lower head member 53 is covered by an upper head member 70 which is so constructed as to provide an even distribution of the flow of water through the granular material in the channel 69. The member 70 comprises a circular plate which lies over the top of the lower head member, being securely fastened thereto by two circular rows of screws 71. Between the rows of screws, the upper head member has a raised section 72 to provide an annular groove forming a discharge channel 73 overlying the annular channel 69. The discharge channel 72 is separated from the annular channel by means of a ring-shaped combined gasket and reversible filter. The filter comprises an annular rubber tube 77 of rectangular cross-section having its upper and lower surfaces perforated by fine perforations similar to those in the inlet filter 29 and small enough to retain a filling such as silica gel, aluminum hydroxide, or extremely fine sand. The upper surface of the tube 77 seats against an annular shoulder in the raised section 72 and beneath the discharge channel 73. Extending radially on each side of the tube 77 are integral flange members 74 which form gaskets between the upper and lower head members on each side of the annular channel 69. A pair of gaskets 78 and 79 of stiffer material underlie the radial flanges on the filter 77 to support the filter against the shoulders below the discharge channel 73. An elbow 80 on top of the raised section 72 communicates with the discharge channel 73 and has the flexible effluent tube 28 of rubber or the like attached to its end.

The rectangular tube outlet filter 77 is of such shape that it can be removed and backwashed by taking off the upper head member 70. Before backwashing it by reinserting it and operating the pump in the normal way, the filter should be raised as well as possible by hand. The outlet filter 77 has a dual purpose. First, it retains the adsorbent material in the channel 69, filtering out any fines before they pass to the channel 73; and second, it provides a safety measure in the event that one of the porcelain filter tubes 64 should break and permit the passage of turbid material through the break.

Figure 14:
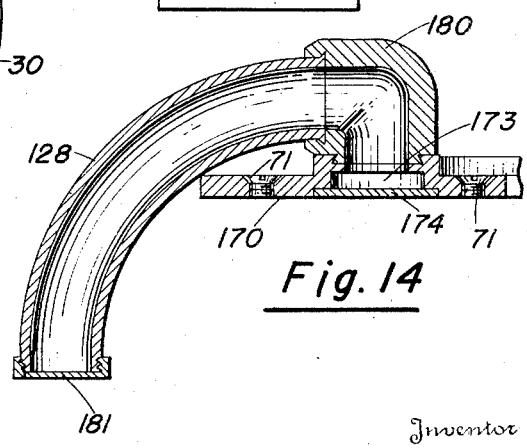
Fig. 14 is a partial view, in section of a modified effluent filter and tube construction.
Figure 12:
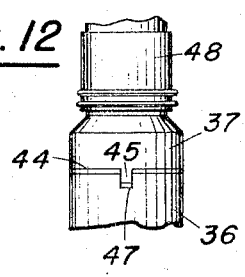
Fig. 12 is a view in side elevation of a portion of the pump cylinder and inlet valve as seen from the direction indicated by the arrow A in Fig. 8.

Another form of upper head member and outlet tube is shown in Fig. 14. In this embodiment the upper head member 170 is essentially the same as that previously described. However, a porous metal filter 174 of fine porosity is soldered to the head member in a channel below the discharge channel 173. This filter has all of the qualities of the filter 74 previously described except that it is not removable and cannot be effectively backwashed, except by a water pressure back through the discharge channel 173.

Another difference lies in the substitution of a metallic discharge tube 128 for the flexible conduit 28 of the previous embodiment. The tube is curved as shown so that it can discharge the purified water into a canteen or other receptacle. In order that the metal tube may be placed out of the way under the pump handle 27 when it is stored in the container, the tube is substantially circular in shape and has a rotatable connection in the elbow 180. The elbow 180 is also rotatably mounted so that after the tube 128 is turned to a horizontal position, the elbow can be rotated to swing the tube out of the way underneath the handle. A removable silver-plated cap 181 is screwed onto the open end of the tube 128 to prevent the entrance of bacteria into the tube, as when the entire filter unit is stored in the container 21. The inside of the tube 128 is silver-plated to inhibit bacteria growth from any vagrant bacteria that might get past the cap 181.

Figure 13:
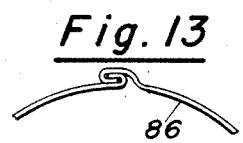
Fig. 13 is a plan view of a portion of a clamping ring used to clamp the fabric bag to one portion of the purifier structure.
Figure 11:
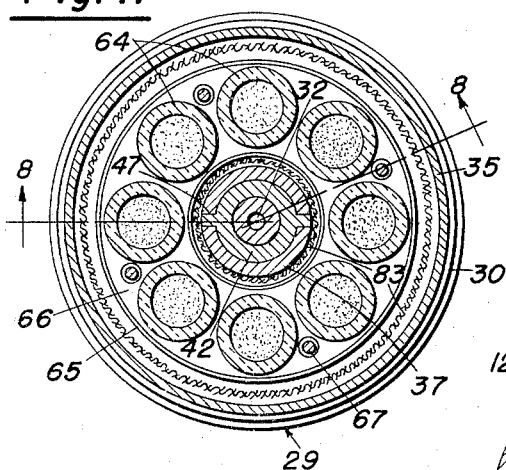
Fig. 11 is a sectional view of the purifier substantially along the line 11—11 of Fig. 8, looking in the direction of the arrows.

The entire filter is designed for dismantling in order to brush the filter tubes clean when they become covered with solid matter from the turbid water. To increase the amount of water purified between cleanings, a fabric bag is provided having a weave of sufficient fineness to filter out most of such material before it reaches the filter tubes. As shown in Fig. 8 a fabric bag 83 has a smaller end clamped to the outside of the cylinder 41 adjacent its top by means of a ring type clamp 84. The bag then passes downwardly between the annular channel member 65 and the post 36, under the channel member 65, and thence upwardly around the outside of the filter tubes to a flange 85 depending downwardly from the head member 53, being clamped to the outside of the flange by a ring clamp 86. Since the entire filter unit is designed for disassembly without any tools so that the filter tubes can be brushed off the clamp 86 is provided with mating hooks on its ends as shown in Fig. 13 so that they can be unhooked by hand to remove the fabric bag from the flange 85. Thus when the upper and lower head members are removed as a unit from the casing 35 by using the handle to unscrew the gland nut 55, the bag 83 is taken off of the flange 85 and the filter tubes are exposed. If it should be necessary to examine the check valves, the bottom of the piston is provided with a projection 87 which can be used as a screw driver in the slot 46 in the bottom of the flanged stud 42. By this means the stud 42 and the entire pump cylinder 41 can be removed so that the two check valves 48 and 49 can be examined and cleaned if necessary.

In the modification shown in Fig. 8a, the portion of casing 135 below the broken line is the same as the embodiment of Fig. 8 except for reduced diameter which is achieved by elimination of the bag 83 of Fig. 8, filter area and the remaining internal structure remaining the same. Upper head member 170 is secured to lower head member 153 by a single threaded joint 171. These parts are separable without the use of special tools since the peripheries of the two members are knurled for grasping by the hands. Resilient O ring 154 provides a seal between lower head member 153 and casing 135, and O rings 178 and 178a provide a seal between the two head members. These rings are so designed that when the head members are assembled, the resilient rings of rubber or the like are compressed laterally from a normally circular section to an oblong section. The action of liquid pressure is such that an increase in pressure increases their sealing characteristics. The manner of sealing the entire head structure to casing 135 is similar to that of Fig. 8 except that gland nut 155 does not apply downward pressure to O ring 154 to effect the peripheral seal thereat. Since the pressure of the gland nut is thereby distributed over the relatively smaller area of gasket 57, this latter seal may be effected with less gland nut pressure. Also, nut 155 is recessed deeper in the head member, permitting the pump handle to rest in a more compact transport position on top of head member 170. Gasket 63 is the same as in Fig. 8, but head member 153 is provided with concentric annular grooves 200 around each of passageways 68 in substantially longitudinal alignment with ceramic tubes 64 and into which the gasket may be compressed, providing an effective seal. Annular channel 169 contains a series of annular disks 201 of flannel or the like having their surfaces coated with a microscopic coating of silica gel or aluminum hydroxide or other adsorbent having a selective affinity for fine carbon particles abrading from the larger granules, these replacing the loose mass of particles of Fig. 8. In some cases it will be found desirable to construct the porous disks 201 with decreasing porosity in the direction of fluid flow, this depending on the conglomerate character of the granular mass used. At the bottom of this channel, a disk-shaped screen 202 provides an annular channel above the plurality of passageways 68 thus increasing the exposed surface of the annular disks 201 to the fines of the mass therebelow. Above these disks is disposed an annular disk 203 of porous metal such as sintered bronze or silver which is forced downwardly by shoulders 204 and 205 and sealed at its periphery by gaskets 206 and 207. This disk has a function similar to filter 77 of Fig. 8, but in addition provides a more effective safety means. In event of leakage upstream thereof, the turbid particles will quickly clog the fibrous disks 201 and the final porous metal filter; meanwhile the porous metal filter is of sufficiently fine porosity to exclude amoebic cysts, perhaps the principal hazard in imbibing raw field water, thus rendering the entire unit inoperative and placing the operator on notice that an internal defect exists.

Elbow 180 is rotatably mounted on the upper head member so that when the device is not in use it may be turned in a position parallel to the pump handle so that no portion of the elbow projects beyond the periphery of casing 135. A rubber or Vinylite gasket 208 provides a seal between the elbow and the casing, the lower portion of the elbow being flared over a stainless steel washer. When in use, it is rotated to the position shown and tube 209 rotatably mounted in elbow 180 is extended until tapered shoulder 210 sealingly engages tapered shoulder 211 and slot or hole 212 is disposed downwardly to direct the effluent to a suitable container. When not in use, tube 209 is sealed to elbow 180 by engagement of tapered shoulder 213 on cap 215 with tapered shoulder 214, thus preventing entry of bacteria or other foreign matter into the purifier. The internal and/or external surfaces of the elbow structure may be silver-plated as in the previous embodiment.

Figs. 15 and 16 show a pump inlet check valve, the lower portion of stud 42 being the same as the embodiment of Fig. 8, but the valve portion being modified. In this embodiment, the valve comprises a stem 225, slidably mounted in a cap 226, and having mounted to the lower end thereof a resilient disc-shaped valve 49' which seats on an annular seat 227. This valve consists of one or more washers of rubber or neoprene which may have the same resilient characteristics, or the upper washer may be somewhat stiffer than the lower washer. These washers rest against a somewhat star-shaped washer 228, best shown in Fig. 16, having cut out portions 229 therein, the washer being a slidable fit within the upper cylindrical chamber of stud 42. The clearance between the outside of valve 49' and the upper cylindrical chamber, and the cutouts 229, provide egress passageways for the liquid flowing from passageway 32 to perforations 230. The valve is urged downwardly by a light compression spring 231, and the cap 226 is retained to the top of stud 32 by a plurality of spring fingers 232 having outwardly projecting legs 233 which spring into a groove on the inner wall of the upper cylindrical chamber.

Fig. 17 illustrates a modified form of filter tube filling which may be incorporated in either of the devices illustrated in Figs. 8 or 8a. In this embodiment, the filter tube remains the same as in the previous embodiments but instead of being filled with a mass of physically separated granular adsorbents, is substantially filled with an adsorbent granular mass of activated carbon in the form of a permeable rod 240. This rod has a shoulder 241 at the upper end thereof which is cemented within the filter tube and a shoulder 242 at the bottom to retain the rod in fixed position relative to the tube. Between the shoulders 241, 242, rod 240 is reduced slightly in diameter to provide an annular channel 243 between the rod and tube. Rod 240 has a non-toxic impermeable coating on its peripheral surface extending from the top to a point near the bottom as shown at 244. Liquid passing through the filter tube passes into channel 243 and thence into the permeable rod at the uncoated portion at 245. It then passes vertically through the rod and out the upper end thereof, discharging into the head member. To increase the size of the discharge channel from the upper end of rod 240, a hole 246 may be provided extending part way down the length of the rod. The upper end of the rod may be treated with an oligodynamic or germicidal material for a short distance from the top as shown by 247, this being effectively accomplished by dipping into the material. While the permeable tube performs the same function as the granular mass previously described, it has the added feature that the particles thereof, being in relatively fixed position, will not abrade against each other, thus eliminating carbon fines from passing into the effluent.

The structure shown in Fig. 17 may be modified by substituting for the coating on rod 240 an impervious tube of plastic or the like, having therein a granular purifying mass such as activated carbon or resinous ion exchangers. The tube may extend substantially the full length of filter tube 64 and be perforated near the bottom thereof, these perforations serving as a means for liquid to enter the lower end of the mass for subsequent passage upwardly. In either the rod structure or tube structure above described, the contact time of the water with the purifying agent is increased over the structure wherein no impermeable coating or tube is used.

Figure 18:
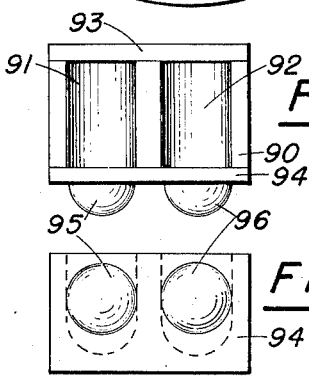
Figs. 18 and 19 are respectively top plan and side elevation views of a device for examining water before and after purification.
Figure 19:
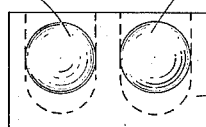

The device shown in Figs. 18 and 19 provides testing means to determine whether or not there is any internal failure in the filter. As illustrated, a block 90 of clear transparent plastic such as "Lucite" has two parallel spaced slots 91 and 92 extending from side to side. The ends of the slots are closed by sheets 93 and 94 of similar material cemented to the side walls of the block thereby forming a pair of troughs side by side. These troughs form separate receptacles for a sample of water before passing through the filter and for a sample of water taken from the filter discharge. A plano-convex lens 95 is cemented to the sheet 94 in line with the trough 91, and a similar lens 96 is cemented in line with trough 92. The lens are of a relatively low magnification and of such a focal length that particles in the water in the troughs will be visible to the eye when viewed through the lens. Thus a visual comparison can be made of purified water as against the unpurified water.

Tests on the filter show that all bacteria; diphtheria, staphylococcus and botulinum toxins; odors and tastes; chlorines; and sulphides and sulphates are removed. About 70 per cent of a lethal dose of cyanide of potassium was removed. Tests also show from 90 to 99 per cent removal of equine virus which is about the size of poliomyelitis, or from 5 to 10 millimicrons.

The invention may be embodied in other specific forms without departing from the spirit or essential characteristics thereof. The present invention and embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention described herein may be manufactured and used by or for the Government of the United States of America for governmental purposes without the payment of any royalties thereon or therefor.

What is claimed is:

1. A water purification apparatus comprising a casing having an inlet in the lower portion thereof and a top having an outlet, said top being detachable from said casing, a pump cylinder extending from the center of said bottom and extending through the center of the top, means including a check valve connecting said cylinder to said inlet, means including a check valve connecting said cylinder to the interior of said casing, an annular series of hollow ceramic filtering tubes surrounding said cylinder and carried by said top within said casing and having their bores connected to said outlet in said top, a tubular fabric filtering bag having one end attached to said top and around the periphery of said series of filtering tubes and its other end attached to said cylinder, said bag extending over the exterior of said annular series of filtering tubes to the bottom thereof and then upward to its point of attachment to said cylinder.

2. A water purification apparatus comprising a cylindrical casing having a fluid inlet in the lower portion thereof, a pump cylinder fixed to the bottom of said casing having an inlet passage through said bottom and an outlet check valve for controlling said fluid inlet, and a detachable lower annular head member closing the top thereof, said head member having an annular channel in the top thereof, hold down means attached to the upper end of said cylinder for pressing said head member on said casing, a series of hollow ceramic filtering tubes supported by said head member within said casing having their bores connected to said channel and their exterior surfaces in communication with said inlet, the bores of said tubes and said channel being filled with a permeable adsorbent mass, an upper annular head member attached to the top of said lower head member around said hold down means, said upper head member having an annular channel overlying said channel in said lower head member, an outlet from said upper head member connected to said channel therein, and a fine porosity filter in one of said channels.

3. The device described in claim 2 wherein said fine porosity filter comprises an annular perforated tube filled with filter material.

4. The device described in claim 2 wherein said fine porosity filter comprises an annular perforated tube filled with a filter material, said tube having inner and outer peripheral flanges which are clamped between the mating surfaces of said upper and lower head members.

5. A combined filter and gasket comprising a perforated annular rubber tube filled with a filter material, there being peripheral flanges integral with said tube and extending inwardly and outwardly therefrom.

6. A water purification apparatus comprising a casing having a bottom and an open top, a head member detachably mounted to the top of said casing providing a closure therefor, water purification means within said casing, a pump unit for delivering water through said purification means, said pump unit having a cylinder a portion of which extends through said head member, means insertable from the lower side of said casing bottom cooperating with said pump cylinder to secure same to the casing bottom, and means cooperating with said pump cylinder and said head member for securing the latter to said casing.

7. The device described in claim 6 wherein said pump cylinder and said casing include cooperating lug and groove means to prevent relative rotation therebetween.

8. The device described in claim 6 wherein the lower end of said pump cylinder includes a cylindrical check valve seat having perforations therein, and a resilient cylindrical sleeve surrounding said valve seat.

9. The device described in claim 6 wherein the means insertable from the lower side of the casing includes an inlet check valve.

10. The device described in claim 6 wherein the means insertable from the lower side of the casing includes flange means cooperable with the bottom of said casing, a threaded portion cooperating with said pump cylinder, a cylindrical inlet check valve seat having perforations therein, and a resilient sleeve surrounding said valve seat.

11. In a pump structure for portable water purification apparatus the combination comprising; a pump cylinder adapted to be inserted into a purifier casing from one side thereof, a member having a portion thereof adapted to be inserted into said casing from an opposite side thereof, said last named portion cooperating with said pump cylinder to secure same to a wall of said casing, a removable pumping device having a piston reciprocably mounted within said cylinder and a handle attached to said piston, and wrench means on said pumping device cooperable with said member to effect the securement aforesaid.

12. A liquid purification apparatus comprising a main casing having an inlet and outlet, a perforated plate screening said inlet, at least one ceramic tube closed at one end and positioned inside said casing adapted to filter liquid passing through the walls thereof, means for forcing liquid through the walls of said tube, an impermeable head hollowed to form a chamber and positioned in extension of the open end of said tube, a chamber inlet formed in extension of said tube, a chamber outlet in line with said main casing outlet, a first filter mass enclosed by said tube and chamber, a second filter mass forming a closure in said chamber outlet, and a secondary casing for said second filter mass, said secondary casing having perforated walls for passing liquid through said second filter mass while preventing escape of the enclosed filter mass.

13. A liquid purification apparatus comprising a main casing having an inlet and outlet, at least one tube having a permeable wall and one closed end positioned inside said casing and adapted to filter liquid passing through the wall thereof, means for forcing liquid through said tube walls, a first filter mass adjacent said casing outlet, a secondary casing for said first filter mass made of impermeable material and having perforated walls for passage of liquid therethrough, a chamber between said secondary casing and the open end of said tube, and a second filter mass in said tube and chamber.

14. A liquid purification apparatus comprising a main casing having an inlet and outlet, at least one tube having a permeable wall and a closed end positioned inside said casing and adapted to filter liquid through said wall, a connecting channel between the tube exterior and casing inlet, a first filter mass adjacent said outlet, a secondary casing of impervious material having perforated walls enclosing said first filter mass, a channel intermediate the open end of said tube and said secondary casing, and a second filter mass in said tube and channel.

15. A liquid purification apparatus comprising a main casing having an inlet and outlet, at least one tube having one closed end and a permeable wall positioned inside said casing and adapted to filter liquid through said wall, a first connecting channel between the tube exterior and casing inlet, means for forcing liquid through a part of said channel and said tube wall, a perforate plate positioned across said main casing outlet, second channel between the perforate plate and the open end of said tube, a first filter mass in said tube, a second filter mass in said second channel, and means independent of said tube for permanently retaining said second filter mass in position.

16. The device described in claim 6 wherein the means insertable from the lower side of the casing includes a resilient rectilinearly reciprocable inlet check valve.

17. The device described by claim 6 wherein said water purification means comprises at least one ceramic tube and a permeable rod of activated carbon disposed therein.

DAVID H. QUINN.

REFERENCES CITED

The following references are of record in the file of this patent:

UNITED STATES PATENTS

| Number | Name | Date |
|---|---|---|
| 449,607 | Beebe | Mar. 31, 1891 |
| 472,547 | Nordtmeyer | Apr. 12, 1892 |
| 519,664 | Chamberland | May 8, 1894 |
| 576,452 | Hart | Feb. 2, 1897 |
| 620,451 | Helwig | Feb. 28, 1899 |
| 629,387 | Nordtmeyer | July 25, 1899 |
| 648,043 | Miles | Apr. 24, 1900 |
| 1,041,378 | Tweeddale | Oct. 15, 1912 |
| 1,119,942 | Fauntleroy | Dec. 8, 1914 |
| 1,248,452 | Caen | Dec. 4, 1917 |
| 1,557,234 | Bechold | Oct. 13, 1925 |
| 1,713,478 | Michel | May 14, 1929 |
| 1,912,304 | Phillips | May 30, 1933 |
| 1,939,981 | Hillyard | Dec. 19, 1933 |
| 2,027,876 | Pennebaker | Jan. 14, 1936 |
| 2,275,607 | Bramming | Mar. 10, 1942 |
| 2,389,189 | Farrel | Nov. 20, 1945 |
| 2,423,940 | Krupp | July 15, 1947 |
| 2,434,958 | Quinn | Jan. 27, 1948 |
| 2,436,077 | Robertson | Feb. 17, 1948 |
| 2,459,376 | Hallinan | Jan. 18, 1949 |

FOREIGN PATENTS

| Number | Country | Date |
|---|---|---|
| 325,004 | Great Britain | Feb. 10, 1930 |
| 479,062 | France | Feb. 9, 1916 |